Nov. 29, 1966 J. C. SUITS 3,289,182

MAGNETIC MEMORY

Filed Dec. 29, 1961

INVENTOR
JAMES C. SUITS
BY [signature]
ATTORNEY

3,289,182
MAGNETIC MEMORY

James C. Suits, Mount Kisco, N.Y., assignor to International Business Machines Corporation, New York, N.Y., a corporation of New York Filed Dec. 29, 1961, Ser. No. 163,245
9 Claims. (Cl. 340—174)

This invention relates to magnetic memories and more particularly to a coincident current magnetic memory having a plurality of column conductors and a plurality of row conductors each of which is made of magnetic anisotropic material wherein a binary memory element is defined by a cross-over section of a row and a column conductor.

Thin magnetic films have received increasing attention during the past few years as prospective computer components. The decrease in total magnetizing energy with decreasing thickness in volume and corresponding reduction of eddy current losses as well as higher switching speeds attainable, are the primary factors which have led to the investigation of thin magnetic films. These thin magnetic films are layers of magnetic material deposited onto a substrate, and generally have a thickness from 1000–2000 A. The fact that cost reducing mass production techniques can be employed in the preparation of thin magnetic film circuits is an important advantage over the use of conventional magnetic units. Thin magnetic films may be produced in different ways, for example by evaporation in a vacuum, by cathode sputtering in a gaseous atmosphere, and by electroplating as discussed by T. D. Knorr, in Technical Report No. 3, September 1958, prepared by Pace Institute of Technology, Atomic Energy Division, and entitled "Geometric Dependence of Magnetic Anisotropy in Thin Iron Films." These films are produced to exhibit uniaxial magnetic anisotropy. By a uniaxial magnetic anisotropy, it is understood to mean that tendency of the magnetization all over the film to align itself along a preferred axis of magnetization. The preferred axis of magnetization is often referred to as the "easy axis," while the direction of the magnetization perpendicular to the easy axis, is termed the "hard direction" of magnetization. Uniaxial anisotropy is generated, for example, by the evaporation of permalloy material, preferably of the composition of 80% nickel and 20% iron, onto a heated substrate in the presence of a static magnetic field applied parallel to the plane of the substrate. During this process, the magnetic field induces the easy axis of magnetization. The results of such a fabrication is that the film, without any external fields, behaves similar to a single domain, i.e. all the magnetization vectors point to the same direction. Where, as discussed above, the film is said to exhibit uniaxial anisotropic characteristics, such a medium then exhibits a single axis along which the particular phenomena takes place, that is opposite remanent orientation states of magnetic flux. It is this characteristic of thin film elements made of magnetic material which is utilized to store binary information, in that, the opposite oriented stable directions of flux are utilized to designate the different binary values 0 and 1.

A. V. Pohm et al. suggested the use of plane magnetic thin film elements exhibiting uniaxial anisotropy for a memory in an article entitled "A Compact Coincident-Current Memory," Proc. of the Eastern Joint Computer Conference, New York, N.Y., December 1956, pp. 120–124, and others, such as Eric E. Bittmann, in an article entitled "Using Thin Films in High Speed Memories," appearing in Electronics, June 5, 1959; S. Methfessel et al. in an article entitled "Thin Magnetic Films," UNESCO, Proc. of the International Conference on Information Processing, Paris, June 15–20, 1959; and K. Raffel et al. in an article entitled "A Computer Using Magnetic Films," UNESCO, Proc. of the International Conference on Information Processing, Paris, June 15–20, 1959, also proposed the use of such uniaxial magnetic thin film elements in coincident-current selection memories.

Heretofore such magnetic thin film memories have comprised a first subassembly comprising a substrate member having magnetic thin film elements deposited thereon arranged in columns and rows. Deposited on this subassembly are alternate layers of insulating and conductive material to provide a composite structure wherein each magnetic element is inductively coupled by an output conductor and a pair of input conductors. The conductors are usually deposited in the form of a strip line by proper masking techniques. In order to avoid problems of air flux coupling associated with such memories employing a single planar spot of magnetic material it has been suggested that a second subassembly similar to the first be provided over the forementioned composite structure. The second subassembly is usually formed by depositing directly on the composite structure. Thus, each magnetic element of the memory almost defines a closed flux path. Such memories, while enjoying the advantages of high switching speeds, high packing densities with a sandwich type arrangement, have the distinct disadvantage of necessitating a multiplicity of deposition steps in their fabrication with the need of a somewhat thick, or many layered, sandwich structure.

It has been found that the above disadvantages are overcome without any appreciable loss of the advantages associated with such thin film magnetic memories by constructing a memory in accordance with the teachings of this invention. What has been found is that a magnetic memory may be simply constructed by providing a plurality of coordinate conductors, each in the form of a strip line, where each conductor is made of magnetic metallic material exhibiting an easy axis of magnetization. Further, it has been found that each of the cross-over sections of the drive lines may be employed for storing a binary bit of information.

Accordingly, it is a prime object of this invention to provide an improved magnetic memory structure.

Another object of this invention is to provide an improved magnetic structure wherein each of the drive lines is made of anisotropic ferromagnetic material exhibiting a substantially rectangular hysteresis characteristic.

A further object of this invention is to provide a simple coordinate address magnetic memory having a plurality of coordinate drive lines made of uniaxial anisotropic metallic magnetic material.

The foregoing and other objects, features and advantages of the invention will be apparent from the following more particular description of a preferred embodiment of the invention, as illustrated in the accompanying drawings.

Figure 3:
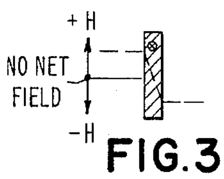
FIG. 3 is a view of the portion of FIG. 2 taken through a section 3—3.

FIG. 4 again illustrates the section 3—3, rotated 90° with respect to the FIG. 3.

Figure 2:
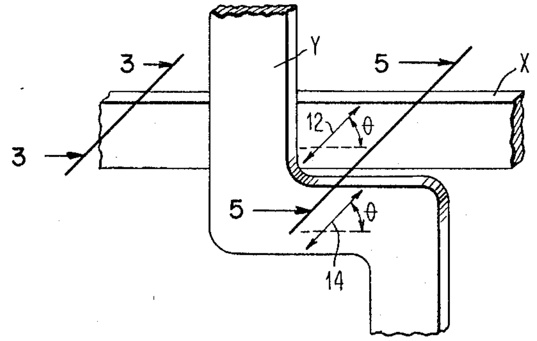
FIG. 2 is an exploded view of a portion of the memory of FIG. 1.
Figure 5:
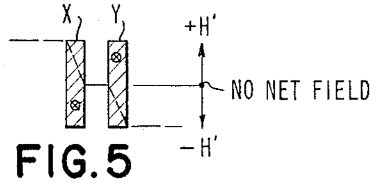

FIG. 5 is a view of the portion of FIG. 2 taken through a section 5—5.

FIG. 6 again illustrates the section 5—5, rotated 90° with respect to the FIG. 5.

Figure 1:
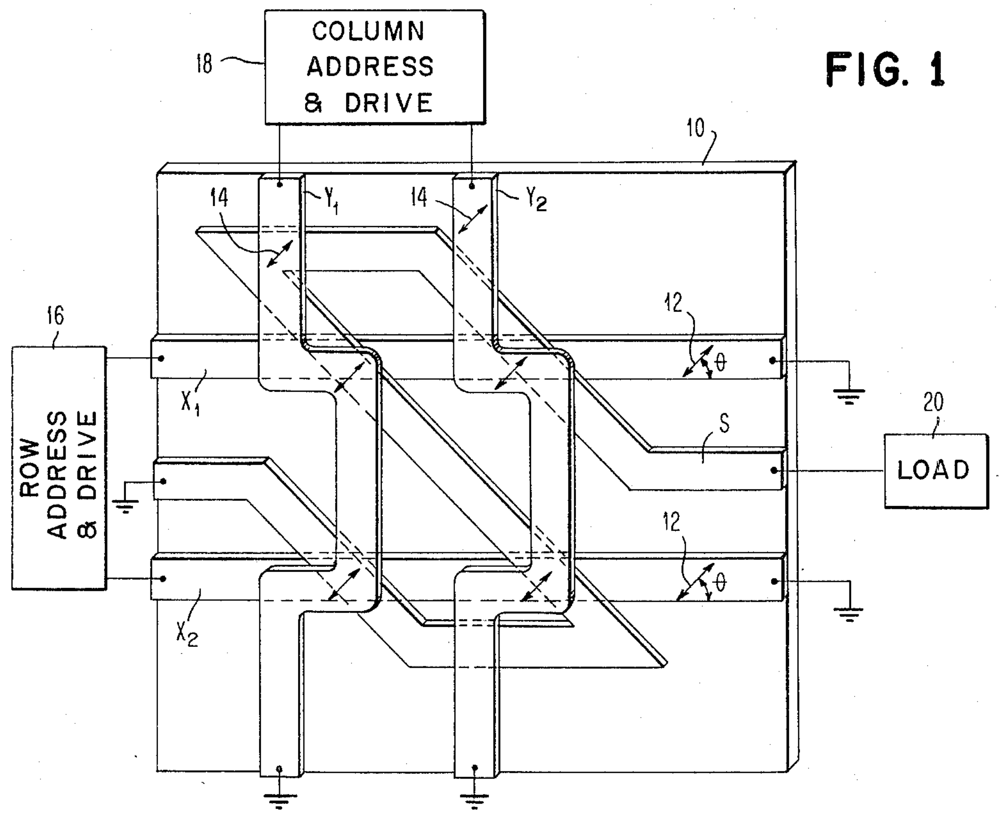
FIG. 1 is a schematic of a magnetic memory according to this invention.

Referring to FIG. 1, a coincident-current selection magnetic core memory, according to this invention, is shown which comprises, a non-magnetic, electrically non-conductive, support member 10, such as glass, having a plurality of column drive lines $Y_1$–$Y_2$, a plurality of row drive lines, $X_1$–$X_2$ and a sense line S deposited thereon. Each of the column, row and sense lines may be deposited by any suitable method, such as evaporation through a marks, so that each line takes the form of a strip line. The memory may be fabricated by first depositing the row drive lines $X_1$–$X_2$ by effectively depositing a layer of approximately 1000–2000 A. of metallic ferromagnetic material, having a composition of approximately 80% nickel and 20% iron (NiFe), and depositing this material in the presence of a magnetic field. Each of the X row drive lines formed then exhibit uniaxial anistropy having an easy axis of magnetization 12, for opposite remanent stable states of flux orientation. The orienting field is so positioned during the deposition process, that the easy axis 12 lines at some angle $\theta$, preferably 45°, with respect to the longitudinal axis of the row drive lines X. Next, a continuous layer of about 1000–2000 A. of insulating material, such as silicon monoxide, (SiO), is deposited over the surface of the support 10 and the row drive lines $X_1$ and $X_2$. An electrically good conductor material, such as copper, is then deposited, to a thickness of approximately 1000–2000 A., on the insulating layer in the form of the sense line S with another insulating layer of silicon monoxide thereafter deposited over the whole surface of the structure. The column drive lines $Y_1$ and $Y_2$ are then formed by a similar deposition process as the lines $X_1$ and $X_2$, in that each of the column drive lines are made of metallic ferromagnetic material and are uniaxial anisotropic, having an easy axis of magnetization 14. The X and Y drive lines are constructed such that at their overlapping regions, a portion of one line, Y, is shaped similar to and parallel with a portion of the other drive line, X, with their respective easy axes, 14 and 12, being in alignment with one another.

The row drive lines $X_1$ and $X_2$ have one end connected to an appropriate row address and drive means 16 with their opposite ends terminated at ground. The column drive lines $Y_1$ and $Y_2$ have one end connected to an appropriate column address and drive means 18 with their opposite end terminated at ground, while the sense line S has one end connected to a load 20 and the other end grounded.

For ease of explanation, an exploded view of an overlapping portion of an X and Y conductor is shown in FIG. 2, wherein the sense line S has been deleted. The overlapping portion of the X and Y drive conductors is here utilized as a storage cell. As an aid in describing the operation of the storage cell of FIG. 2, a view, taken through a section 3—3 of the portion shown in FIG. 2, is shown in FIG. 3 and this view is again shown in FIG. 4, rotated 90° with respect to the FIG. 3.

Figure 4:
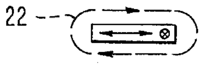

Referring to the FIGS. 2, 3, and 4, asume a row conductor X is energized to provide a current directed from left to right. The current is indicated in FIGS. 3 and 4 by a cross (+) notation, resembling the tail of an arrow defining current directed into the page. With current directed into the page as shown in FIG. 4, a clockwise flux pattern 22 is set up about the X drive conductor. Referring to the FIG. 3, the field (H) experienced within the row conductor X is at a positive maximum (+H) along one edge, and linearly decreases to a negative maximum (−H) at the opposite edge, providing no net field across the total cross-sectional area of the X row conductor. An analogous operation takes place with energization of only the Y column conductor. Since there is no net field provided across any one of the ferromagnetic drive conductors X or Y when individually energized, whatever the remanent orientation state of magnetization originally retained by each drive conductor, this original state is not altered.

In order to explain the operation of the storage cell of FIG. 2 upon energization of both X and Y drive lines, coincidently, reference will be made to FIG. 5, which is a view of the storage portion of FIG. 2 taken through a section 5—5, and to the FIG. 6 which is the view shown in FIG. 5, rotated 90°.

Figure 6:
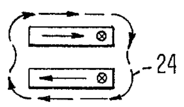

Referring to FIGS. 2, 5 and 6, assume, as shown by the arrow (+) notation, that current is coincidently passed from left to right in the X row drive line and from top to bottom in the Y column drive line. As is shown in FIG. 6, with current directed into the page in both X and Y drive lines, a clockwise flux pattern 24 is set up about both drive lines X and Y. Intermediate the X and Y drive lines, the direction of flux about each individual line, X and Y, oppose one another and hence cancel. Thus, as shown in FIG. 5, a maximum positive field (+H′) is experienced along one edge of the X drive line, linearly decreases to zero at the opposing edge, is at zero at an adjacent edge of the Y drive line and then linearly decreases to a negative maximum (−H′) at the opposite edge of the Y drive line. The net field provided across the cross-sectional area of the X row drive line is then positive while the field provided across the cross-sectional area of the Y drive line is negative. Hence, the magnetization in the X row drive line in the overlapping portion shown in FIG. 2, is established in a given remanent orientation direction, while the magnetization in the Y column drive line in the overlapping portion shown in FIG. 2, is established in an opposite remanent orientation direction. Analogously, coincident energization of both the X row drive line and the Y column drive line, shown in FIG. 2, to provide currents of opposite magnitude, i.e. current directed out of the page, as opposed to current directed into the page shown in FIGS. 5 and 6, the magnetization of the overlapping portions of both X and Y drive lines is reversed. The magnetization state of both the X row drive line and Y column drive line as shown in FIG. 6 is then considered as a stored binary 1, while magnetization in an opposite direction defines a stored binary 0.

Referring now to FIG. 1, the sense line S couples the X row drive lines only in each overlapping portion of the X and Y drive lines, which defines a binary storage cell. Switching of the magnetic material of the X row drive line only, defined by the overlapping portion of both X and Y drive lines, is then detected by a flux change, and hence an induced voltage in the sense line S. Assuming information in the form of a binary 1 is to be written in the storage cell defined by the overlapping portion of the $Y_1$ and $X_1$ drive lines both the $X_1$ and $Y_1$ drive lines are coincidently energized with impulses of similar polarity. Current then flows through both the $X_1$ and $Y_1$ drive lines and causes the magnetization in the overlapping portion of $X_1$ and $Y_1$ drive lines to be established either in a binary 1 or a binary 0 state, as defined above, in accordance with the polarity of the impulses applied to both these drive lines. The storage cell defined by the overlapping portion of the $X_1$ and $Y_2$ drive lines is not effected since the net field to the $X_1$ drive line in the latter storage cell provides no net field across its cross-sectional area, as was shown and described with respect to FIGS. 3 and 4. Similarly, the storage cell defined by the overlapping portion of the $Y_1$ and $X_2$ drive lines is not effected since there is no net field provided across the cross-sectional area of the $Y_1$ drive line.

While the invention has been particularly shown and described with reference to a preferred embodiment thereof, it will be understood by those skilled in the art that various changes in form and details may be made therein without departing from the spirit and scope of the invention.

What is claimed is:

1. A data storage device comprising, a first and a second planar magnetic element, each of said elements made of uniaxial anisotropic metallic magnetic material having an easy axis of remanent flux orientation angularly displaced with respect to a given axis in the plane of the element, said elements positioned one over the other in field coupling proximity, means for coincidently passing in a common direction a first current impulse through said first element along the given axis thereof to produce a magnetic field in said second element and a second current impulse through said second element to produce a magnetic field in said first element for switching both said first and second elements from an initial remanent orientation state to an opposite orientation state and means for sensing the orientation states.

2. A data storage device comprising, a first and second planar magnetic element, each of said elements made of uniaxial anisotropic metallic magnetic material having an easy axis of remanent flux orientation angularly displaced with respect to a given axis thereof, said elements positioned one over the other in field coupling proximity with their respective easy axes in alignment, means for coincidently passing in a common direction a first current impulse through said first element along the given axis thereof to produce a magnetic field in said second element and a second current impulse through said second element along the given axis thereof to produce a magnetic field in said first element for switching both said first and second elements from an initial remanent orientation state to an opposite remanent orientation state and means for sensing the orientation states.

3. A data storage device comprising, a first and a second planar magnetizable element, each of said elements made of uniaxial anisotropic metallic magnetic material having an easy axis of remanent flux orientation angularly displaced with respect to a given axis thereof, said elements positioned one over the other in field coupling proximity and with their respective easy axes in alignment, means for storing data in said device comprising, means for coincidently passing in a common direction a first current impulse of a given polarity through and directed along the given axis of said first element to produce a magnetic field in said second element and a second curent impulse of said given polarity through and directed along the given axis of said second element to produce a magnetic field in said first element for establishing said first element in a first remanent orientation state and said second element in an opposite orientation state and means for sensing the remanent orientation states.

4. A data storage device comprising, a first and a second planar elongated magnetizable element, each of said elements made of uniaxial anisotropic metallic magnetic material having an easy axis of remanent flux orientation displaced 45° with respect to the longitudinal axes of said elements, said elements positioned one over the other in field coupling proximity and with their respective easy axes in alignment, means for storing data in said device comprising, means for coincidently passing in a common direction a current impulse of a given polarity through and directed along the longitudinal axis of said first element and a current impulse of said given polarity through and directed along the longitudinal axis thereof for establishing said first element in a first remanent orientation state and said second element in an opposite orientation state and means for sensing the remanent orientation states.

5. A data storage device comprising, a first electrically conductive magnetic element capable of exhibiting two stable states of flux remanence having a flux path without said element, said element exhibiting one of said states, a second electrically conductive magnetic element disposed in said flux path, means for passing current in a common direction through said first and second elements to produce a magnetic field in said first magnetic element for establishing said first element in the other of said two stable states of flux remanence, and means for determining the stable states of said first magnetic element.

6. A data storage device as set forth in claim 5 wherein one of said elements has an easy axis of magnetization disposed at an angle to the direction of said magnetic field.

7. A data storage device as set forth in claim 6 wherein said angle is substantially 45 degrees.

8. A data storage device as set forth in claim 6 wherein said second magnetic element has an easy axis of magnetization substantially aligned with the easy axis of said first magnetic element.

9. A data storage device as set forth in claim 8 wherein said angle is substantially 45 degrees.

References Cited by the Examiner

UNITED STATES PATENTS

| | | | |
|---|---|---|---|
| 3,015,807 | 1/1962 | Pohm | 340—174 |
| 3,095,555 | 6/1963 | Moore | 340—174 |
| 3,154,765 | 10/1964 | Alexander | 340—174 |
| 3,182,296 | 5/1965 | Baldwin | 340—174 |
| 3,233,228 | 2/1966 | Kaspar | 340—174 |

OTHER REFERENCES

Publication I, The Bell System Technical Journal, volume 36, No. 6, November 1957, pp. 1319 to 1340.

TERRELL W. FEARS, *Acting Primary Examiner.*

IRVING SRAGOW, *Examiner.*

M. S. GITTES, R. R. HUBBARD, *Assistant Examiners.*